United States Patent Office 2,878,251
Patented Mar. 17, 1959

2,878,251
NICOTINIC ACID ESTER OF 7-OXYETHYL THEOPHYLLINE

Konrad Lothar Zirm and Alfred Pongratz, Steiermark, Austria, assignors to Lannacher Heilmittel Ges. m. b. H., Lannach, Steiermark, Austria, an Austrian limited partnership No Drawing. Application October 30, 1956
Serial No. 619,116

Claims priority, application Austria December 14, 1955

1 Claim. (Cl. 260—256)

The present invention relates to a new nicotinic acid ester which is of special importance because of its excellent pharmacological properties.

It has been discovered, and this constitutes the object of the present invention, that this new nicotinic acid ester can be obtained, if nicotinic acid or compounds containing the nicotinic acid radical, are reacted with 7-oxyethyl theophylline. For producing the ester suitable functional derivatives of the nicotinic acid, for example nicotinic acid anhydride or nicotinic acid halides in form of their halogen hydracid salts, are condensed with the 7-oxyethyl theophylline. If desired, also nicotinic acid can be reacted directly with the 7-oxyethyl theophylline in the presence of water absorbent agents, as for instance phosphorus oxychloride. In case of the use of nicotinic acid halide-halogen hydracid salts, especially nicotinic acid chloride-hydrochloride or in the case of nicotinic acid, the condensation with the 7-oxyethyl theophylline is preferably effected in the presence of tertiary bases. As examples of such tertiary bases pyridine, quinoline and dimethyl aniline may be mentioned. If neecssary, the reaction can be effected also with an addition of inert solvents, as for example alkylbenzenes or chlorobenzenes.

The pharmacological properties of the components used are modified in a remarkable and valuable manner by the esterification of the hydroxyl compounds.

The following examples will further illustrate how the invention may be carried out. The invention is, however, not restricted to these examples.

Example 1

22.5 parts of 7-oxyethyl theophylline and 30 parts of nicotinic acid anhydride are well mixed and kept one and a half hours in a vessel preheated to a temperature of about 150° to 160° C. There is obtained a colourless melt which freezes on cooling. Then the product is dissolved in 30 parts by volume of water and after cooling until the end of the evolution of carbon dioxide sodium bicarbonate is added. There are precipitated crystals in a great extent, which are sucked off and washed with water. The raw product obtained is dissolved in the about 50-fold amount of hot water, then the solution is filtered in hot condition and allowed to crystallise.

Thus 32 parts of the nicotinic acid ester of 7-oxyethyl theophylline are obtained in the form of colourless crystals having a melting point of 152° to 155° C. The compound is hardly soluble in cold water, but easier soluble in alcohol.

The 7-oxyethyl theophylline-nicotinic acid ester is a new, pharmacologically very effective compound and shows above all a prolonged and increased action on the vascular system with decreased toxicity.

Example 2

67.2 parts of 7-oxyethyl theophylline are mixed with 51.0 parts of nicotinic acid chloride-hydrochloride and 102 parts by volume of pyridine. Then the mixture is heated during 80 minutes on the steam bath and afterwards 600 parts by volume of water are added. Then 60 parts of sodium bicarbonate and 15 parts of sodium carbonate are stirred in, the crystals precipitated are sucked off after longer standing, washed with water and dried. Thus the nicotinic acid ester of 7-oxyethyl theophylline is obtained in a yield of 80 parts. The compound is identical with the compound obtained according to Example 1.

What is claimed, is:

The new 7-oxyethyl theophylline-nicotinic acid ester, having a melting point of 152° to 153° C.

References Cited in the file of this patent

UNITED STATES PATENTS

| | | |
|---|---|---|
| 1,611,978 | Wolffenstein | Dec. 28, 1926 |
| 2,485,152 | Hartmann et al. | Oct. 18, 1949 |
| 2,510,164 | Woodward et al. | June 6, 1950 |
| 2,714,109 | Kottler et al. | July 26, 1955 |
| 2,759,945 | Anderson | Aug. 21, 1956 |

FOREIGN PATENTS

| | | |
|---|---|---|
| 724,256 | Great Britain | Dec. 16, 1952 |

OTHER REFERENCES

Donatelli et al.: Chemical Abstracts, vol. 49, p. 3390h (1956); abstracted from Minerva Medica, 1951, I, page 1117.